(12) United States Patent
Rhine et al.

(10) Patent No.: US 8,209,512 B1
(45) Date of Patent: Jun. 26, 2012

(54) SELECTING A CELL THAT IS A PREFERRED CANDIDATE FOR EXECUTING A PROCESS

(75) Inventors: Scott Rhine, Isanti, MN (US); Michey N. Mehta, San Jose, CA (US); David M. Bernardo, West Townsend, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 583 days.

(21) Appl. No.: 12/404,935

(22) Filed: Mar. 16, 2009

(51) Int. Cl.
*G06F 12/00* (2006.01)

(52) U.S. Cl. ........................................ 711/170; 711/156

(58) Field of Classification Search .................... None
See application file for complete search history.

(56) References Cited

FOREIGN PATENT DOCUMENTS

WO   WO 2009101563 A1 * 8/2009

* cited by examiner

*Primary Examiner* — Shawn X Gu

(57) ABSTRACT

According to one embodiment, a request is received for executing a process on a computer. Information is accessed for a plurality of cells associated with the computer. A cell is selected that is the preferred candidate among the plurality of cells for executing the process using memory, which resides on the selected cell, based, at least in part, on the accessed information and the request.

15 Claims, 4 Drawing Sheets

SELECTING A CELL THAT IS A PREFERRED CANDIDATE FOR EXECUTING A PROCESS

BACKGROUND

Many computers include cells that have one or more processors. Cells typically communicate with each other over a bus. Memory can be associated with each cell. Processes can be executed by one or more of the cell processors and data can be stored in memory associated with the cells. Portions of a process' data can be spread across the memory associated with different cells. The memory that data can be spread across is commonly referred to as "interleaved memory" or "a pool of interleaved memory."

BRIEF DESCRIPTION OF THE DRAWINGS

The accompanying drawings, which are incorporated in and form a part of this Description of Embodiments, illustrate various embodiments of the present invention and, together with the description, serve to explain principles discussed below.

The drawings referred to in this Brief Description should not be understood as being drawn to scale unless specifically noted.

DESCRIPTION OF EMBODIMENTS

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in the following Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Unless specifically stated otherwise as apparent from the following discussions, it is appreciated that throughout the present Description of Embodiments, discussions utilizing terms such as "receiving," "accessing," "selecting," "determining," "multiplying," "calculating," "configuring," "executing," "adding," "subtracting," "transforming data," or the like, refer to the actions and processes of a computer system, or electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. Some embodiments of the subject matter are also well suited to the use of other computer systems such as, for example, optical and virtual computers.

Figure 1:
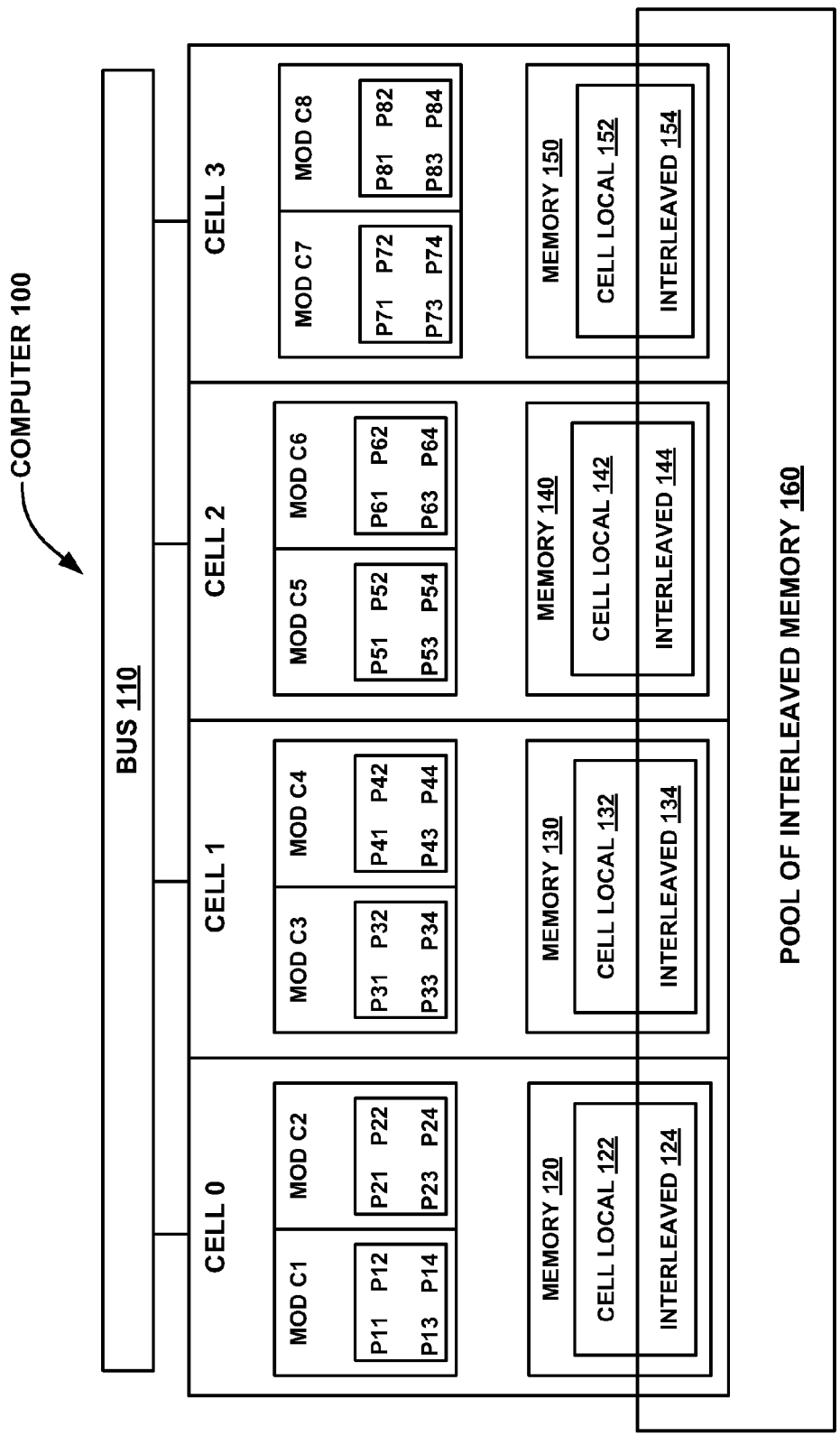
FIG. 1 depicts a block diagram of a computer, according to one embodiment.

Many computers, such as computer 100 depicted in FIG. 1, include cells 0-3 that have one or more processors p11-p14, p21-p24, p31-p34, p41-p44, p51-p54, p61-p64, p71-p74, p81-p84. Cells 0-3 typically communicate with each other over a bus 110. Memory 120, 130, 140, 150 can be associated with each cell 0-3 in the form of cell local memory (CLM) 122, 132, 142, 152 and interleaved memory 124, 134, 144, 154. Cell local memory 122, 132, 142, 152 is memory that that is local to the cell executing a process. For example, local memory 122 stores data for processes executing on cell 0 and local memory 132 stores data for processes executing on cell 1 and so on. In contrast, portions of a process' data can be spread across the interleaved memory 124, 134, 144, 154. For example, the data for a process executing on cell 2 may be stored in interleaved memory 124, 134, and 154 associated with the other cells 0, 1, and 3. The interleaved memories 124, 134, 144, 154 associated with the cells 0-3 are associated with a pool of interleaved memory 160, according to one embodiment.

A process can access locally stored data more quickly than the process can access remotely stored data. For example, a process that is executing on cell 1 can access data that is stored in cell 1's local memory 132 more quickly than the same process can access data stored in a different cell 2's interleaved memory 144. Further, longer paths between processes and accessed data result in slower access times. Typically the access time ranges from 500 nanoseconds (ns) to 800 ns depending on the length of the path between a module that is executing a process and a second module that stores data. Non-Uniform Memory Architecture (NUMA) refers to a computer architecture that uses a plurality of processors where the memory access times depend on the length of the path between an executing process and the memory the process accesses.

The individual times that a process accesses its interleaved data tend to average out. For example, assume that a process is executing on cell 1 and has data stored in cell 1's interleaved memory 134 and data stored in cell 2's interleaved memory 144. The process could access its data in the cell 1's interleaved memory 134 more quickly than it could access its data in the cell 2's interleaved memory 144. However, the average access times for different processes tend to be approximately the same for a given computer architecture. Therefore, the interleaved memory scheme is referred to as a "uniform service model."

Although the access times for different processes tend to be approximately the same for a given computer architecture, a process' average memory access time depends on the length of the architected path between a processor and memory. Therefore, a computer with longer architected paths will experience longer average access times. For example, the average access time for a 32 cell computer would be higher than for a single cell computer or a 4 cell computer. In a specific example, a single cell machine would typically have an access time of only 500 ns. In a second specific example, assume that a computer with 4 cells has 3 cells with an access time of 800 ns and 1 cell with an access time of 500 ns. The average access time for the 4 cell computer would be (3×800+500)/4 or 725 ns. In a third specific example, a computer with 32 cells may have an average access time of 788 ns. As can be seen from these examples, the single cell computer has the fastest average access time of 500 ns, the computer with 32 cells has the slowest average access time of 788 ns, and the computer with 4 cells has an intermediate average access time of 725 ns.

As can be seen, average access times will decrease as a company migrates to computers with larger numbers of cells. Therefore, according to one embodiment, a cell that is the preferred candidate for providing cell local memory is selected to execute a process. For example, assume that a computer includes a first cell and a second cell. Further, assume that the first cell has enough cell local memory to store the processes' data and the second cell does not have enough cell local memory to store the processes' data. In this case, the first cell may be selected to execute the process and to store the process' data. Selecting, when possible, a cell that has sufficient cell local memory to execute a process provides a shorter path length between the process and the process' data, in comparison to storing the process' data in interleaved memory. Thus, the process' average access time is lower using various embodiments, in contrast to using conventional methods.

FIG. 1 depicts a block diagram of a computer 100, according to one embodiment. The blocks that represent features in FIG. 1 can be arranged differently than as illustrated, and can implement additional or fewer features than what are described herein. Further, the features represented by the blocks in FIG. 1 can be combined in various ways.

The computer 100 includes four cells 0-3, memory 120-150, and a bus 110. The cells 0-3 include modules C1-08. For example, cell 0 includes modules C1, C2. Cell 1 includes modules C3, C4 and so on. A cell 0-3 can have two or more modules. Typically a module C1-08 has 1-4 processors or 1-8 processors. However, a module C1-08 may have other configurations of processors.

Each of the modules C1-08 includes processors. For example, module C1 includes processors p11-p14, module C2 includes processors p21-p24, module C3 includes processors p31-p34, module C4 includes processors p41-p44, module C5 includes processors p51-p54, module C6 includes processors p61-p64, module C7 includes processors p71-p74 and module C8 includes processors p81-p84.

The memory 120-150 includes interleaved memory 124, 134, 144, 154 and cell local memory (CLM) 122, 132, 142, 152. The interleaved memory 124, 134, 144, 154 are associated with a pool of interleaved memory 160. The cell local memory 122, 132, 142, 152 is used to store data for processes executing on the cell 0-3 where the cell local memory 122, 132, 142, 152 resides. For example, the cell 0's cell local memory 122 would store data for processes that execute on the processors p11-p24 that reside on cell 0.

Examples of a process include, among other things, a virtual machine or a database program. A virtual machine simulates a physical machine, according to one embodiment. According to one embodiment, a virtual CPU (VCPU) is a thread of a virtual machine, where the VCPU simulates a physical CPU. The processors p11-p14, p21-p24, p31-p34, p41-p44, p51-p54, p61-p64, p71-p74, p81-p84 are examples of physical CPUs that can execute a virtual machine. Each virtual CPU, associated with the same request for a virtual machine, is executed on different physical CPUs, according to one embodiment, to prevent deadlocks. For example, a deadlock may occur between two virtual CPUs that execute on the same physical CPU, if the two virtual CPUs try to communicate with each other, for example, using globally shared spinlocks. Virtual CPUs that do not communicate with each other can execute on the same physical CPU, according to one embodiment. Typically, virtual CPUs associated with different requests for starting virtual machines do not communicate with each other. Although, many of the embodiments are described in the context of a virtual machine, various embodiments can be used with any type of process.

Certain types of processes spend most of their computing time accessing data; whereas, other types of processes spend most of their computing time processing data. Processes that spend most of their time accessing data are referred to as input/output (I/O) intensive; whereas, processes that spend most of their time processing data are referred to as central processing unit (CPU) intensive. An I/O intensive process performs significantly better when its data is stored in memory that is local to the cell executing the I/O intensive process. The term cell local memory (CLM) shall refer to memory that is local to the cell executing a process.

One way of ensuring that an I/O intensive process' data is stored in cell local memory is to dedicate processor sets to the process. However, dedicating processor sets to a process results in an under utilization of the processor set, since, the processor set would be idle when the process is not executing. In contrast, according to one embodiment, a cell that is the preferred candidate for providing cell local memory is selected to execute the process, as described herein.

According to one embodiment, cell local memory 122-152 and interleaved memory 124-154 are associated with each cell 0-3. Cell local memory 122-152 is used to store data for processes that execute on the same cell's local memory 122-152, according to one embodiment. For example, cell 0's local memory 122 would store data for processes that execute on cell 0's processors p11-p14, p21-p24. Cell 0's cell local memory 122 would not store data for processes that execute on another cell, such as cells 1-3, according to one embodiment.

The interleaved memory 124-154 stores operating system (OS) data to provide a uniform service model to any process that requests OS services, according to one embodiment. Similarly, data for global services may be stored in interleaved memory 124-154. Interleaved memory 124-154 can also be used to store a non-I/O intensive process' data. Further, interleaved memory 124-154 can be used to store an I/O intensive process' data when there is insufficient cell local memory 122-152 to store the data.

According to one embodiment, CLM round robin is used for storing data for certain requests. For example, assume that the amount of memory requested exceeds the amount of cell local memory associated with any of a computer's cells. However, there is enough total cell local memory available in the computer to satisfy the requested cell local memory. For example, assume that a computer with two cells A and B receives a request for 4 GBs of memory allocation with a preference for cell local memory. However, cell A has 3 GBs of cell local memory available and cell B has 3 GBs of cell local memory available. In this case, 2 GBs of available cell local memory from each of the cells A and B can be used to satisfy the request, for example.

Figure 2:
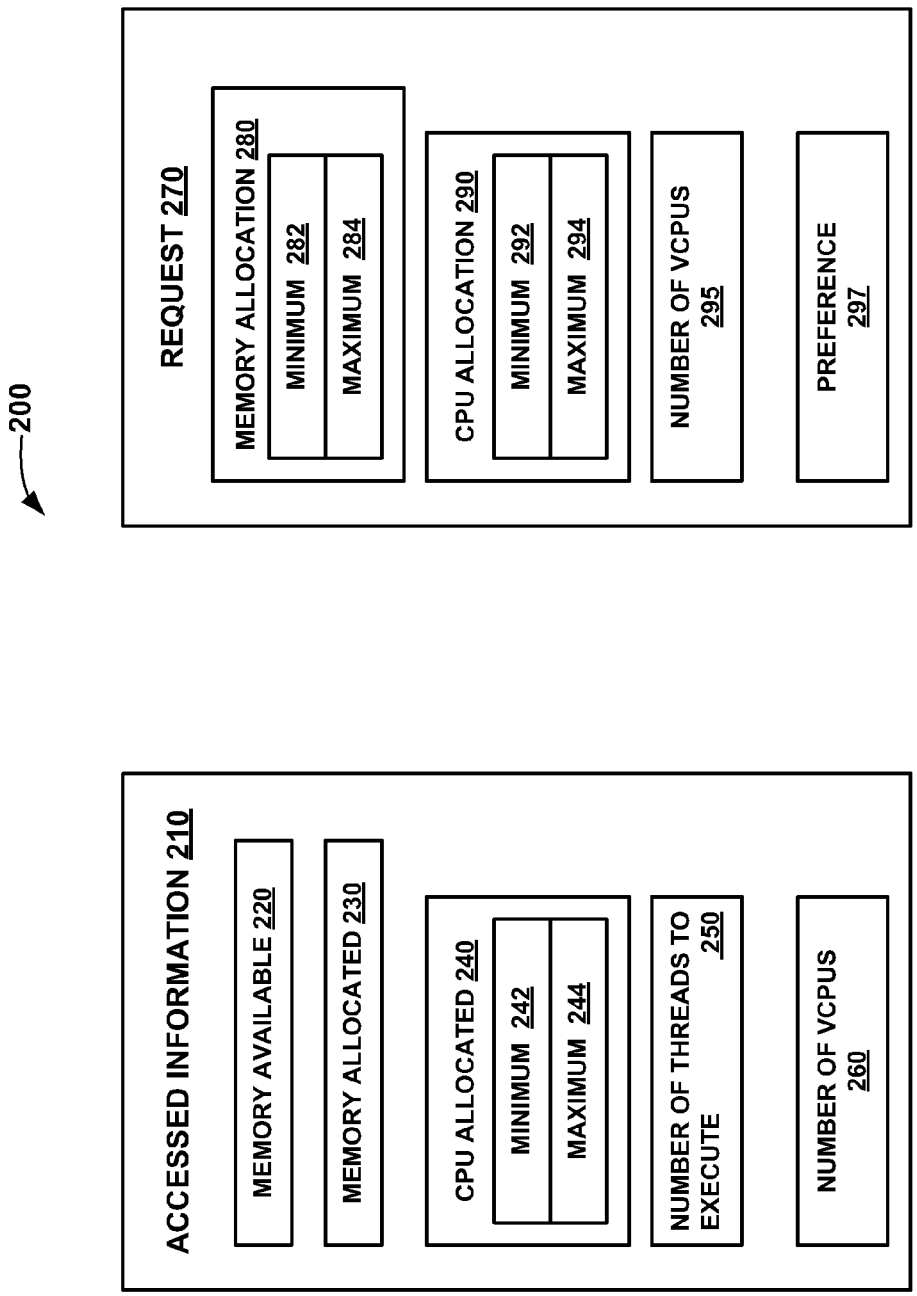
FIG. 2 depicts information that is used as a part of selecting a cell that is the preferred candidate for executing a process, according to one embodiment.

FIG. 2 depicts information 200 that is used as a part of selecting a cell 0-3 for executing a process, according to one embodiment. For example, referring to FIG. 2, information 210 can be associated with each cell 0-3 and information can be associated with a request 270 for executing a process. The information 210 for each cell 0-3 can be accessed, for example, as a part of selecting a cell 0-3 and, therefore, is referred to as accessed information 210.

The accessed information 210 includes any one or more of memory available 220, memory allocated 230, CPU allocated 240, number of threads to execute 250, and number of VCPUs 260, among other things, according to one embodiment. For example, the memory available 220 is the amount of memory that can be provided to start a virtual machine associated with the received request 270, according to one embodiment. The memory allocated 220 is the amount of memory that processes, which are currently scheduled to execute on a cell 0-3, are entitled to. The CPU allocated 240 is the amount of CPU that currently scheduled processes are entitled to. The CPU allocated 240 includes a range that has been specified in terms of a minimum 242 and a maximum 244. The number of threads 250 is the number of threads that are expected to execute on a cell 0-3. For example, according to one embodiment, the number of threads 250 is the total number of threads that have been requested by processes that are scheduled to execute on a cell 0-3. The number of VCPUs 260 is the total number of VCPUs that have been requested by processes that are scheduled to execute on a cell 0-3. According to one embodiment, the threads are the same as the VCPUs for all VMs that occupy the same cell.

The request 270 includes one or more of memory allocation 280, CPU allocation 290, number of VCPUs 295, and a preference 297 for executing a new virtual machine (also referred to as the "requested virtual machine"), among other things, according to one embodiment. For example, the memory allocation 280 is the amount of memory that is requested for executing a new virtual machine. The CPU allocation 290 is the amount of CPU that is requested for executing the new virtual machine. A range can be associated with the memory allocation 280 and the CPU allocation 290 that are each specified, for example, in terms of a minimum 282, 292 and a maximum 284, 294. The number of VCPUs 295 is the number of VCPUs that the new virtual machine is requesting to execute. Examples of preferences 297 are preferences for cell local memory or for interleaved memory, among other things. Frequently, administrators know ahead of time whether a process is I/O intensive, or processor intensive, among other things. Various embodiments enable an administrator to specify a preference 297 for executing the requested virtual machine.

According to one embodiment, various scores are calculated as a part of selecting a cell that is the preferred candidate for executing a virtual machine. A CPU score can be calculated for each cell to reflect how well each cell can satisfy a requested CPU allocation. A memory score can be calculated for each cell to reflect how well each cell can satisfy a requested memory allocation. A cell score can be calculated to reflect how well a cell can satisfy, among other things, the requested CPU allocation and the requested memory allocation. The scores can be compared to each other as a part of selecting a cell that is the preferred candidate for executing a virtual machine, as will become more evident.

CPU scores, memory scores and cell scores range between 0 and 1, according to one embodiment. A sliding scale is provided, according to one embodiment, so that the scores for each cell 0-3 can be compared. A CPU score for a cell is set to a value, such as −1, if the cell will not provide sufficient CPU to accommodate the requested minimum CPU 292 for starting a new virtual machine. Similarly, a memory score for a cell is set to a value, such as −1, if the cell will not provide sufficient memory to accommodate the requested minimum memory 282 for starting a new virtual machine. Although −1 is used as an example of a value that indicates that a request 270 for the minimum memory 282 or minimum CPU 292 will not be met, other values can be used. A value, such as 0, can be used to indicate that a requested minimum of memory 282 or a requested minimum of CPU 292 can be provided by a cell 0-3 but no additional memory or CPU beyond the requested minimum can be provided. Although 0 is used as an example of a value that indicates a requested minimum memory or a minimum CPU can be met, other values can be used.

The following equation can be used to determine either a CPU score or a memory score, as will become more evident.

$$\frac{\text{actual} - \text{requested minimum}}{\text{requested maximum} - \text{requested minimum}} \qquad \text{Equation 1}$$

A cell score is a score for a cell 0-3 that reflects aspects of, at least, the CPU score and the memory score for that cell 0-3. According to one embodiment, the cell score may reflect the number of threads 250 to execute on a cell 0-3. According to another embodiment, the cell score may be weighted with a CPU dominance factor (also referred to as a "CPU dominance") to reflect, for example, that I/O intensive processes use CPU more than memory, as will become more evident. The cell score may be computed using $$(C \times F + M) \times N + (N - T) \qquad \text{Equation 2}$$

where C is a cell's cpu score, F is the CPU dominance factor based on the performance benefit that results from executing an input/output (I/O) intensive VM, using cell local memory, on a particular computer architecture, M is the cell's memory score, N is the number of threads that the cell is capable of executing and T is the number of threads 250 that will execute on the cell. Although, many embodiments are described with an N of 256, other values of N are well suited for various embodiments.

The CPU performance, and, therefore, the CPU dominance, will vary depending on the architecture of a computer. Some types of architectures provide better performance than other types of architectures when an I/O intensive process is executed, using cell local memory, instead of interleaved memory. For example, one type of architecture may provide a 20 percent performance increase when an I/O intensive process is executed using cell local memory, as compared to using interleaved memory. A second architecture may provide a 30 percent performance increase when an I/O intensive job is executed using cell local memory, as compared to using interleaved memory. The CPU dominance, according to one embodiment, is determined by dividing 100 percent by the percent performance increase. For example, the first architecture would have a CPU dominance of 100% divided by 20% or 5, whereas, the second architecture would have a CPU dominance of 100% divided by 30% or 3.33.

Manual methods are not suited for selecting a cell. For example, the information that a computer system would use to compute scores changes so rapidly that by the time a human could compute scores manually, the scores would no longer be of value for selecting a cell to execute a process.

According to one embodiment, CLM round robin is used for storing data for certain requests 270. For example, assume that the amount of memory requested exceeds the amount of cell local memory 122, 132, 142, 152 associated with any of a computer 100's cells 0-3. However, there is enough total cell local memory 122, 132, 142, 152 available in the computer 100 to satisfy the requested cell local memory. For example, assume that a request 270 specifies 4 GBs for memory allocation 282 and a preference 297 for cell local memory. However, cell 0 has 3 GBs of cell local memory available and cell 1 has 3 GBs of cell local memory available. In this case, 2 GBs of available cell local memory from each of the cells 0 and 1 can be used to satisfy the request 270 for 4 GBs of memory allocation 282, for example.

According to one embodiment, prefilters are used to determine which requests 270 to calculate cell scores for. For example, if the requested amount of memory 280 is greater than the total amount of CLM 122-152 associated with any cell 0-3 and the requested amount of memory 280 is greater than the amount of free memory associated the pool of interleaved memory 160 for all of the cells 0-3, then the virtual machine will not be executed on any single cell, according to one embodiment. In this case, scores would not be calculated for the request 270. Instead, according to one embodiment, interleaved or round robin methods can be used to execute the requested virtual machine.

If the requested CPU allocation 290 is greater than what can be satisfied by any single cell, then the virtual machine is not executed on any of the cells 0-3, according to one embodiment. For example, assume that a computer has two cells A and B and there are 4 processors on each of the cells A and B. Therefore, the computer includes a total of 8 processors. Also assume that 8 single VMs, where each has an associated VCPU, are executing. One VCPU is running on each of the 8 processors in order to prevent dead locks. Each of the VCPUs is entitled to a minimum of 90 percent and a maximum of 100 percent of their respective physical processors. If a request 270 specifies 20 percent for minimum CPU allocation 292 and 90 percent for maximum CPU allocation 294, none of the cells A or B will be used to satisfy the request 270, according to one embodiment. For example, assume that the minimum CPU allocated 242 for cell A and B is 90 percent. 90 percent plus the 20 percent of minimum CPU allocations requested 292 equals 110 percent, which exceeds the capacity of both cells A and B. Therefore, according to one embodiment, the process is executed using interleaved memory. A process that is executed using interleaved memory can be scheduled on any cell 0-3 associated with a computer 100.

If the amount of memory associated with the interleaved memory pool 160 is larger than the amount of cell local memory 122-152 associated with any cell 0-3 and the customer has not specified a preference 297, then the virtual machine is executed using interleaved memory 160, according to one embodiment.

If the amount of memory associated with the interleaved memory pool 160 is larger than the requested amount of memory 280 and the customer has specified a preference 297 for interleaved memory, then the virtual machine is executed using interleaved memory 160, according to one embodiment.

If the requested amount of memory 280 is larger than the available memory, which includes available memory associated with a cell's CLM 122-152 and any cell 0-3's interleaved memory 124-154, then CLM round robin is used, according to one embodiment, as described herein.

If the requested number of virtual CPUs 295 is greater than the number of CPU's associated with any cell 0-3, then the virtual machine is executed using interleaved memory 160, according to one embodiment. These are just a few examples of prefilters, according to various embodiments. Based on these examples, any one of ordinary skill in the art could implement other types of prefilters that are well suited for various embodiments.

Figure 3:
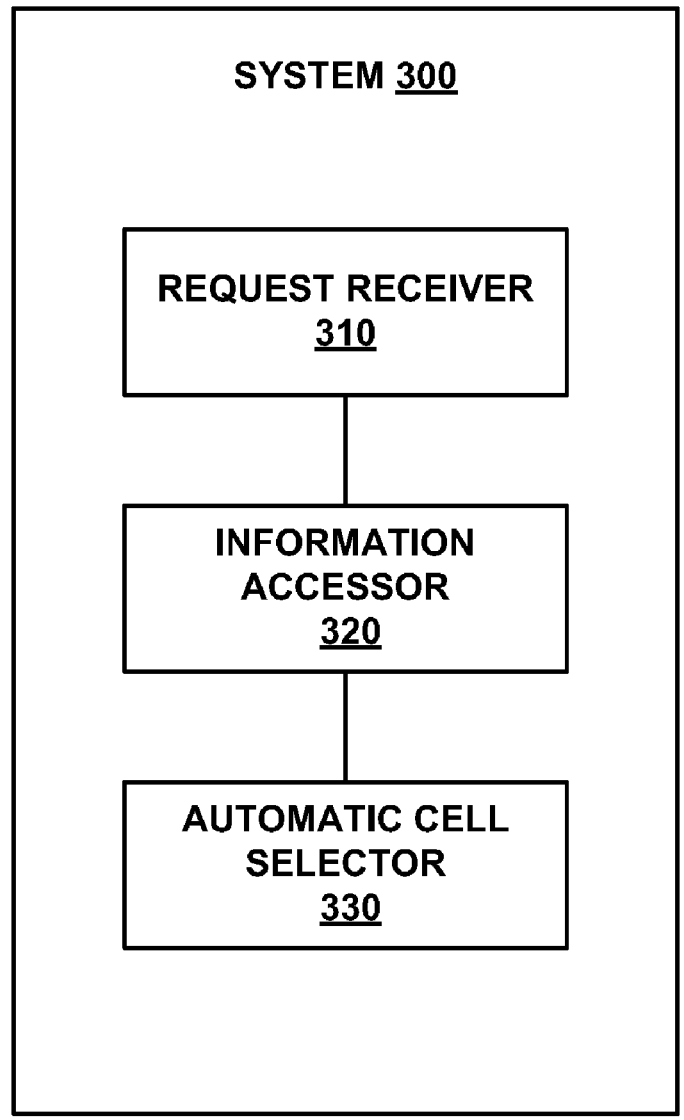
FIG. 3 depicts a block diagram of a system for selecting a cell that is the preferred candidate for executing a process, according to one embodiment.

FIG. 3 depicts a block diagram of a system 300 for selecting a cell 0-3 that is the preferred candidate for executing a process, according to one embodiment. The blocks that represent features in FIG. 3 can be arranged differently than as illustrated, and can implement additional or fewer features than what are described herein. Further, the features represented by the blocks in FIG. 3 can be combined in various ways. The system 300 can be implemented using software, hardware, firmware, or a combination thereof.

As depicted in FIG. 3, the system 300 includes a request receiver 310, an information accessor 320, and an automatic cell selector 330. The request receiver 310 is configured for receiving a request 270 for executing a process on a computer 100. The information accessor 320 is configured for accessing information 210 for a plurality of cells 0-3 associated with the computer 100. Accessed information 210 is associated with each of the plurality of cells 0-3, according to one embodiment. The automatic cell selector 330 is configured for selecting a cell that is the preferred candidate, among the plurality of cells 0-3, for executing the process using memory 122-152 that resides on the selected cell based, at least in part, on the accessed information 210 and the request 270. According to one embodiment, the system 300 may reside at a "computer-implemented entity." The term "computer-implemented entity" shall be used to refer to a process scheduler or some other entity that communicates with the process scheduler. The process scheduler may be a part of an operating system, for example, that executes on the computer 100.

Figure 4:
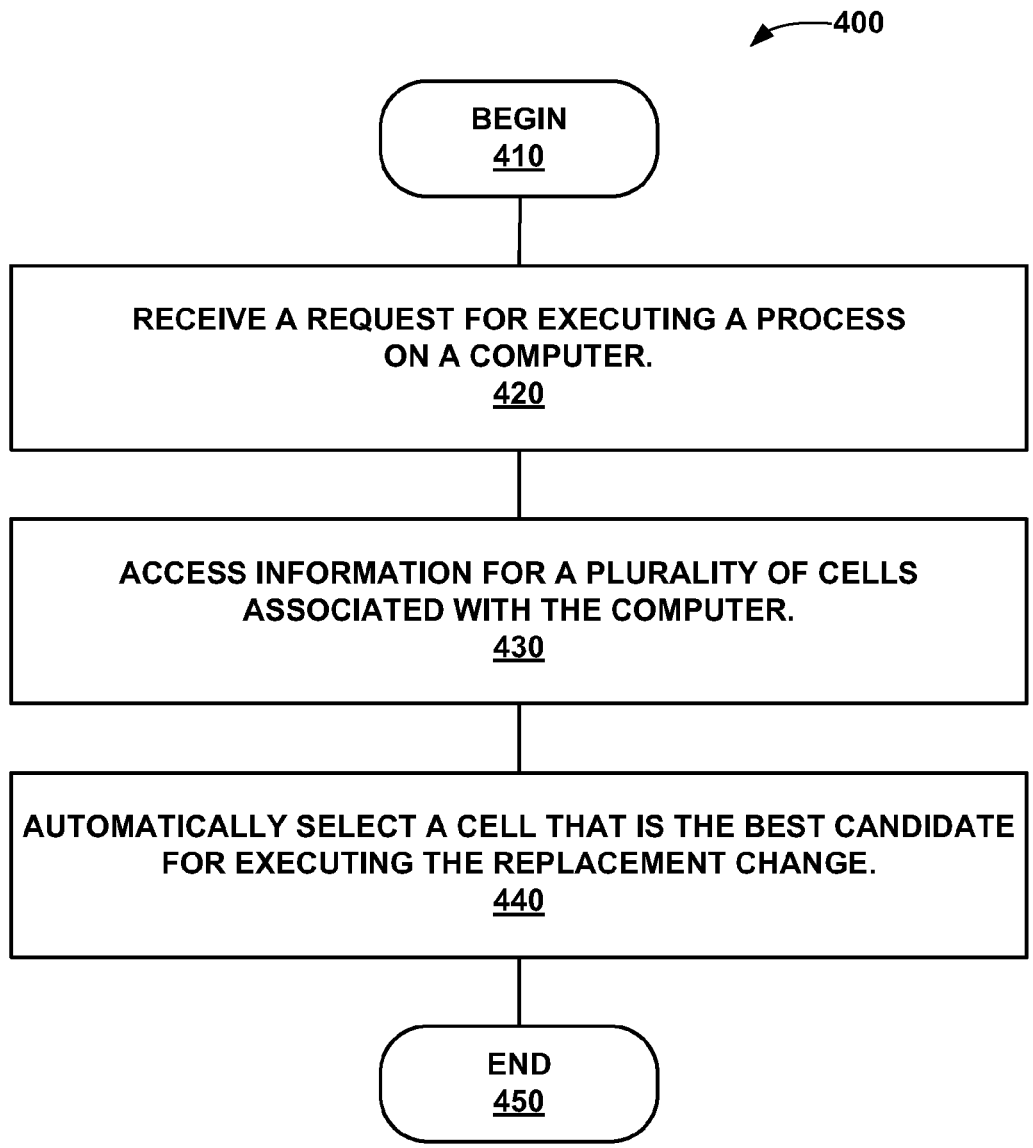
FIG. 4 depicts a flowchart for selecting a cell that is the preferred candidate for executing a process, according to one embodiment.

FIG. 4 depicts a flowchart 400 for selecting a cell that is the preferred candidate for executing a process, according to one embodiment. Although specific steps are disclosed in flowchart 400, such steps are exemplary. That is, embodiments of the present invention are well suited to performing various other steps or variations of the steps recited in flowchart 400. It is appreciated that the steps in flowchart 400 may be performed in an order different than presented, and that not all of the steps in flowchart 400 may be performed.

Assume for this illustration that a process, such as a virtual machine, is started as the result of a computer 100 booting or as the result of receiving an entered start command. According to one embodiment, a first set of cells includes all of the cells 0-3 associated with the computer 100. Prefilters, as described herein, have been used to filter the first set of cells resulting in a second set of cells, which includes all or a subset of the first set of cells.

At 410, the method begins.

At 420, a request for executing a process on a computer 100 is received. For example, the request 270 includes requested central processing unit allocation information, such as CPU allocation 290 depicted in FIG. 2, and requested memory allocation information, such as memory allocation 280 depicted in FIG. 2. The request 270 may also specify the number of requested VCPUs 295 and a preference 297, such as cell local memory.

At 430, information for a plurality of cells associated with the computer is accessed. For example, the accessed information 210 can include central processing unit allocation information, such as CPU allocated 240 depicted in FIG. 2, memory allocation information, such as memory available 220 or memory allocated 230 depicted in FIG. 2, and the number of threads 250 that are expected to execute, such as the number of threads 250 depicted in FIG. 2. The accessed information 210 may also include a number 260 (FIG. 2) of the VCPUs that are expected to execute on a cell 0-3. According to one embodiment, there is accessed information 210 for each cell 0-3 associated with a computer 100 (FIG. 1).

At 440, a cell that is the preferred candidate among the plurality of cells for executing a process using cell local memory is selected based, at least in part, on the accessed information and the request. For example, an array of cell scores can be used to store cell scores for each of the cells 0-3 associated with the second set of cells. Each element in the array can be assigned a cell score for a cell 0-3 that corresponds to that array element. For example, the first element can contain a cell score for cell 0, the second element can contain a cell score for cell 1 and so on. Although this example refers to an array of cell scores, some other well known type of data structure can be used for storing cell scores.

According to one embodiment, if none of the cells 0-3 in the second set can meet either the requested CPU allocation 290 or the requested memory allocation 280, then the virtual machine will not be executed at this time.

According to one embodiment, if none of the cells 0-3 in the second set satisfy the requested memory allocation 280, then the virtual machine is executed using CLM round robin, as described herein. According to one embodiment, CLM round robin can be used in this illustration, since, the prefilters would have filtered this request 270 out if the total amount of CLM 122-152 associated with a computer 100 did not satisfy the requested memory allocation 280.

According to one embodiment, if none of the cells 0-3 in the second set satisfy the requested CPU allocation 290, then the virtual machine is executed using interleaved memory 160.

If one or more cells are found that satisfy the requested memory allocation 280 and the requested CPU allocation 290, then the identifier of the cell with the highest cell score is returned, according to one embodiment. For example, assume that a request 270 for executing a virtual machine has values, as depicted in Table 1 below, and a computer 100's four cells 0-3 each has accessed information 210, as depicted in Table 2 below. In this illustration, each row in Table 2 corresponds to accessed information 210 for one cell 0-3.

Table 1 depicts values that are associated with a request 270 (FIG. 2), according to one embodiment.

| | |
|---|---|
| Minimum Memory Allocation 282 | 2 GBs |
| Maximum Memory Allocation 284 | 6 GBs |
| Minimum CPU Allocation 292 | 5 percent |
| Maximum CPU Allocation 294 | 5 percent |
| Number of VCPUs 295 | 1 |
| Preference 297 | Cell local memory |

Table 2 depicts values that are associated with accessed information 210 (FIG. 2), according to one embodiment.

| Cell No. | Number of VCPUs 260 | Minimum CPU Allocation 242 | Maximum CPU Allocation 244 | Memory Allocation 230 | Memory Available 220 |
|---|---|---|---|---|---|
| 0 | 4 | 50 percent | 91 percent | 8 GBs | 2 GBs |
| 1 | 4 | 50 percent | 91 percent | 6 GBs | 4 GBs |
| 2 | 4 | 50 percent | 95 percent | 4 GBs | 6 GBs |
| 3 | 4 | 50 percent | 50 percent | 5 GBs | 5 GBs |

Assume that each cell 0-3 has 10 GBs of cell local memory 122-152. The memory allocation 230 and memory available 220, depicted in Table 2, are based on cell local memory. Memory available 220 is computed by subtracting the allocated memory 230 from the total amount of cell local memory, which in this illustration is 10 GBs.

In this example, all of the cells 0-3 will have a CPU score of 1 because both the minimum and maximum requested CPU allocations 242, 244 can be satisfied by all of the cells 0-3. For example, 91 percent maximum CPU allocation 244 for cells 0 and 1 plus 5 percent for the request 270's maximum CPU allocation 294 is 96 percent, which is less than or equal to 100 percent. 95 percent maximum CPU allocation 244 for cell 2 plus 5 percent for the request 270's maximum CPU allocation 294 is 100 percent. 50 percent maximum CPU allocation 244 for cell 3 plus 5 percent for the request 270's maximum CPU allocation 294 is 55 percent, which is less than or equal to 100 percent.

In this example, cell 0 has a memory score of 0 since the requested minimum memory allocation 282 can be satisfied. More specifically, cell 0 has 2 GBs of memory available 220, which is sufficient to satisfy the request 270's minimum memory allocation 282 of 2 GBs.

Cell 1 has a memory score of 0.5. For example, cell 1 has 10 GBs of total memory and 6 GBs of memory allocated 230, leaving 4 GBs of memory available 220. 2 GBs minimum memory allocation 282 is requested and 6 GBs maximum memory allocation 284 is requested. Using equation 1, cell 1's memory score can be computed with (4 GBs memory available (220)−2 GBs of minimum memory allocation requested (282)) divided by (6 maximum memory allocation requested (284)−2 minimum memory allocation requested (282)), which results in a memory score of 0.5 for cell 1.

Cell 2 has a memory score of 1 because cell 2 can satisfy both the requested minimum memory allocation 282 and the requested maximum memory allocation 284. For example, cell 2 has 6 GBs of memory available, which is sufficient to satisfy the 2 GBs of requested minimum memory allocation 282 and the 6 GBs requested maximum memory allocation 284.

Cell 3 has a memory score of 0.75. For example, cell 3 has 10 GBs of memory available 220 and 5 GBs of memory allocated 230 leaving 5 GBs of memory available 220. 2 GBs of minimum memory allocation 282 is requested and 6 GBs of maximum memory allocation 284 is requested. Using equation 1, cell 3's memory score can be computed with (5 GBs memory available (220)−2 GBs of minimum memory allocation requested (282)) divided by (6 maximum memory allocation requested (284)−2 minimum memory allocation requested (282)), which results in a memory score of 0.75 for cell 3.

In this example, cell 2 has the highest memory score of 1.0. Since all of the cells 0-3 have the same CPU score, the cell 0-3 with the highest memory score would be the preferred candidate for executing the virtual machine that is requested, according to one embodiment. Cell scores could be computed for a plurality of cells 0-3 and compared to determine the preferred candidate among the plurality of cells 0-3. For example, the cell score for cell 2, according to one embodiment, is computed using $(C \times F + M) \times N + (N - T)$ or $(1 \times 5 - 1) \times 256 + (256 - 4) = 1788$. The cell score for cell 3, using the same equation, would be $(1 \times 5 + 0.75) \times 256 + (256 - 4) = 1724$. Cell 2's score of 1788 is higher than cell 3's score of 1724. Therefore, cell 2's identifier is returned, according to one embodiment, to indicate that cell 2 is the preferred candidate for executing the requested virtual machine.

In another example, assume that a request 270 has values as depicted in Table 3 below. Assume that computer 100 has three cells 0-2 instead of four cells 0-3. The computer 100's three cells 0-2 have accessed information 210, as depicted in Table 4 below, where each row in Table 4 is accessed information 210 for one cell 0-2.

Table 3 depicts values that are associated a request 270 (FIG. 2), according to one embodiment.

| | |
|---|---|
| Minimum Memory Allocation 282 | 4 GBs |
| Maximum Memory Allocation 284 | 4 GBs |

-continued

| Minimum CPU Allocation 292 | 5 percent |
| Maximum CPU Allocation 294 | 100 percent |
| Number of VCPUs 295 | 1 |
| Preference 297 | Cell local memory |

Table 4 depicts values that are associated with accessed information 210 (FIG. 2), according to one embodiment.

| Cell No. | Number of VCPUs 260 | Minimum CPU Allocation 242 | Maximum CPU Allocation 244 | Memory Allocation 230 | Memory Available 220 |
| --- | --- | --- | --- | --- | --- |
| 0 | 4 | 50 percent | 92 percent | 5 GBs | 5 GBs |
| 1 | 4 | 50 percent | 90 percent | 6 GBs | 4 GBs |
| 2 | 4 | 50 percent | 90 percent | 7 GBs | 3 GBs |

The memory allocations 230 and memory available 220 are based on cell local memory. Each cell 0-2 has 10 GBs of cell local memory 122, 132, 142, 152. Memory available 220 is computed by subtracting the allocated memory 230 from the total amount of cell local memory.

In this example, cell 2 will be disqualified since it has 3 GBs of available memory, which is not enough to satisfy either the requested maximum 284 or minimum 282 memory allocations of 4 GBs. Cell 2 is assigned a memory score of −1, according to one embodiment, to indicate that cell 2 does not satisfy either the minimum 282 or the maximum 284 requested memory allocations.

Cells 0 and 1 have respectively 5 GBs and 4 GBs of memory available 220 and, therefore, satisfy the maximum and minimum memory allocations 282, 284 of 4 GBs. Cells 0 and 1, according to one embodiment, are assigned memory scores of 1 to indicate that they satisfy the minimum and maximum requested memory allocations 282, 284.

According to one embodiment, CPU scores are computed for cells 0 and 1. To compute the CPU scores, assume that each virtual machine takes turns running in proportion to how much CPU has been guaranteed by the CPU allocated 240, until one of the virtual machines reaches a maximum. Also, assume that the rest of the run time is distributed proportionately among the remaining virtual machines. For example, out of a single second, assume that a virtual machine on cell 0 executes for 50 ticks, representing the 50 percent minimum CPU allocation 242, and that the requested virtual machine would execute for 5 ticks, representing the 5 percent requested minimum CPU allocation 292. Over an extended period of time, 5 out of every 55 ticks (50% minimum CPU allocation 242+5% requested minimum CPU allocation 292) on average would be scheduled to the requested virtual machine. In this case, 5% divided by 55% would result in 9.091 percent actual CPU being scheduled to the requested virtual machine. Therefore, the existing virtual machine is projected to receive the remaining 90.9 percent (100%−9.091%) of the CPU, if the requested virtual machine is executed on cell 0. Since the requested minimum CPU allocation 292 is 5 percent and the maximum CPU allocation 244 is 100 percent, cell 0's CPU score can be computed using equation 1 as follows:

$$\frac{9.091 \text{ percent actual } CPU \text{ allocation} - 5 \text{ percent minimum } CPU \text{ allocation requested (292)}}{100 \text{ maximum } CPU \text{ allocation requested (294)} - 5 \text{ minimum } CPU \text{ allocation requested (292)}}$$

This results in a CPU score of 4.09 divided by 95 or 0.05263 for cell 0.

For cell 1, the running virtual machine has a maximum CPU allocation 244 of 90 percent. Therefore, a new virtual machine would get 10 percent. Although 90.91 percent is available in this illustration, 90 percent is the requested upper limit, therefore, according to one embodiment, the calculation stops at 90 percent. In this illustration, a CPU score for cell 1 can be computed using equation 1 as follows:

$$\frac{10 \text{ percent actual } CPU \text{ allocation} - 5 \text{ percent minimum } CPU \text{ allocation requested (292)}}{100 \text{ maximum } CPU \text{ allocation requested (294)} - 5 \text{ minimum } CPU \text{ allocation requested (292)}}.$$

This results in a CPU score of 4.09 divided by 95 or 0.04305 for cell 0. The CPU score for cell 1 is higher than the CPU score for cell 0. Cell scores could be computed for cells 0 and 1. Since the memory scores for cells 0 and 1 are the same, given that cell 1's CPU score is higher than cell 0's CPU score, cell 1's cell score will also be higher than cell 0's cell score. Cell 1's identifier is returned, according to one embodiment, since cell 1 is the preferred candidate for executing the requested virtual machine in this example.

At 450, the method ends.

Selecting a cell that is a preferred candidate for executing a process provides for transforming a computer 100 into a different state. An example of transforming the state of the computer 100 is transforming the computer 100 from executing one set of processes to executing a different set of processes, for example, as the result of selecting a cell for executing a new process.

Selecting, when possible, a cell that has sufficient cell local memory to execute a process provides a shorter path length between the process and the process' data, in comparison to storing the process' data in interleaved memory. For example, assume that cell 1 has enough cell local memory to store a process' data and cells 0, 2 and 3 do not have enough cell local memory. Even though cell 1 has enough cell local memory, conventional methods may select a cell, such as cell 0, to execute the process and store the process' data in interleaved memory 134, 144, 154 associated with other cells 1, 2, 3. In contrast, according to various embodiments, cell 1 is selected to execute the process and the process' data is stored in cell 1's local memory 132. As can be seen, the path length between cell 1 and its cell local memory 132 is shorter than the path length between cell 0 and interleaved memories 134, 144, and 154. Thus, the path length for accessing the process' data is shorter using various embodiments, resulting in the process' average access time being lower, in contrast to conventional methods.

According to one embodiment, a process scheduler can use the returned cell identifier to schedule the requested virtual machine on the identified cell. As new processes start executing and currently executing processes complete execution, the balance between the various processes may change. Therefore, according to one embodiment, a currently executing process can be moved in order to improve over all performance. In this case, various embodiments can also be used to select a new cell for executing the process.

According to one embodiment, the request receiver 310 performs operation 420, the information accessor 320 performs operation 430, and the automatic cell selector 330 performs operation 440.

Although for the sake of simplicity, the illustrations that were based on Tables 1-4 resulted in all of the cells either having the same CPU score or the same memory score, embodiments are well suited for selecting the preferred candidate for executing a virtual machine when one or more of the CPU scores or one or more of the memory scores, or a combination thereof, are not the same.

Any one or more of the embodiments described herein can be implemented using computer readable storage medium and computer-executable instructions which reside, for example, in computer-readable medium of a computer system or like device. The computer readable storage medium can be any kind of memory that instructions can be stored in. Examples of the computer readable storage medium include, but are not limited to, a disk, a compact disk (CD), a digital versatile device (DVD), read only memory (ROM), flash, and so on. As described above, certain processes and steps of embodiments of the present invention are realized, in one embodiment, as a series of instructions (e.g., software program) that reside within computer readable storage memory of a computer system and are executed by the processor of the computer system. When executed, the instructions cause the computer system to implement the functionality of the embodiments of the present invention.

Accessed information 210 and requests 270, according to various embodiments, provide for selecting a cell 0-3 that is the preferred candidate for executing a process, while reducing the probability of impacting the performance of a currently executing process.

Selecting a cell 0-3 that is the preferred candidate for executing a process, instead of using dedicated processor sets, according to various embodiments, provides for adding virtual CPUs or adding virtual memory to a currently executing process.

Various embodiments have been described in various combinations. However, any two or more embodiments may be combined. Further, any embodiment may be used separately from any other embodiments.

Example embodiments of the subject matter are thus described. Although various embodiments of the subject matter have been described in a language specific to structural features and/or methodological acts, it is to be understood that the appended claims are not necessarily limited to the specific features or acts described above. Rather, the specific features and acts described above are disclosed as example forms of implementing the claims.

What is claimed is:

1. A method for selecting a cell that is a preferred candidate for executing a process, the method comprising:
   receiving, at a computer-implemented entity, a request for executing the process on a computer;
   accessing, at the computer-implemented entity, information for a plurality of cells associated with the computer;
   determining scores for at least two of the cells based, at least in part, on the request and the accessed information; and
   selecting, at the computer-implemented entity, the cell that is the preferred candidate, among the plurality of cells, for executing the process using memory that resides on the selected cell based, at least in part, on the accessed information and the request.

2. The method as recited by claim 1, wherein the method further comprises:
   determining central processing unit (CPU) scores and memory scores for two or more of the cells based, at least in part, on the request and the accessed information;
   determining cell scores for at least two or more of the cells based, at least in part, on respective CPU scores and memory scores; and
   selecting the cell that is the preferred candidate based, at least in part, on cell scores.

3. A system for selecting a cell that is a preferred candidate for executing a process, the system comprising:
   a processor for executing instructions; and
   a computer-readable storage medium with the instructions that the processor executes stored in the computer-readable storage medium, wherein the processor executes the instructions that implement:
   an information accessor configured for accessing information for a plurality of cells associated with a computer;
   a determinant module configured for determining scores for at least two of the cells based, at least in part, on a request for executing the process and the accessed information; and
   an automatic cell selector configured for selecting the cell that is the preferred candidate, among the plurality of cells, for executing the process using memory that resides on the selected cell based, at least in part, on the accessed information and the request for executing the process.

4. The system of claim 3, wherein the request includes a preference for executing the process and wherein the automatic cell selector is configured for selecting the cell that is the preferred candidate based, at least in part, on the preference.

5. The system of claim 3, wherein the request includes requested central processing unit (CPU) allocation information and requested memory allocation information.

6. The system of claim 5, wherein the requested memory allocation information includes a requested minimum memory allocation and a requested maximum memory allocation and wherein:
   the automatic cell selector is configured for selecting the cell that is the preferred candidate based, at least in part, on a memory score that is calculated by
   (memory available on the selected cell minus the requested minimum memory allocation) divided by (the requested maximum memory allocation minus the requested minimum memory allocation).

7. The system of claim 5, wherein the requested CPU allocation information includes a requested minimum CPU allocation and a requested maximum CPU allocation and wherein:
   the automatic cell selector is configured for selecting the cell that is the preferred candidate based, at least in part, on a CPU score that is calculated by
   (actual CPU allocation on the selected cell minus the requested minimum CPU allocation) divided by (the requested maximum CPU allocation minus the requested minimum CPU allocation).

8. The system of claim 5, wherein the automatic cell selector is configured for:
   determining a CPU score based, at least in part, on the requested CPU allocation information and the accessed information;
   determining a memory score based, at least in part, on the requested memory allocation information and the accessed information; and selecting the cell that is the preferred candidate based, at least in part, on the CPU score and the memory score.

9. The system of claim 8, wherein the automatic cell selector is configured for:
   adding the memory score to a product of the CPU score multiplied by a CPU dominance factor that reflects a performance increase when executing an input/output (I/O) intensive process using cell local memory in comparison to using interleaved memory; and
   selecting the cell that is the preferred candidate based, at least in part, on a result of adding the memory score to the product of the CPU score multiplied by the CPU dominance factor.

10. The system of claim 9, wherein the result is a first result and wherein the automatic cell selector is configured for:
   determining a second result by multiplying the first result by a number of threads that the selected cell is capable of executing and adding a difference between the number of threads the selected cell is capable of executing and a number of threads 250 to execute on the cell; and
   selecting the cell that is the preferred candidate based, at least in part, on the second result.

11. A computer readable storage medium having computer-readable program instructions stored thereon for causing a computer system to perform a method of selecting a cell that is a preferred candidate for executing a process, the method comprising:
   calculating cell scores for at least two of a plurality of cells associated with a computer based on a request for executing the process and accessed information for the plurality of cells associated with the computer; and
   selecting the cell that is the preferred candidate, among the plurality of cells, for executing the process using memory that resides on the selected cell based, at least in part, on the cell scores.

12. The computer readable storage medium of claim 11, wherein the method further comprises:
   determining central processing unit (CPU) scores and memory scores for two or more of the cells based, at least in part, on the request and the accessed information;
   determining cell scores for at least two or more of the plurality of cells based, at least in part, on respective CPU scores and memory scores; and
   selecting the cell that is the preferred candidate based, at least in part, on cell scores.

13. The computer readable storage medium of claim 11, wherein the request for executing the process includes requested central processing unit allocation information and the accessed information includes accessed central processing unit allocation information, and wherein the method further comprises:
   determining a central processing unit (CPU) score based, at least in part, on the requested central processing unit allocation information and the accessed central processing unit allocation information; and
   selecting the cell that is the preferred candidate based, at least in part, on the CPU score.

14. The computer readable storage medium of claim 13, wherein the method further comprises:
   multiplying the CPU score by a CPU dominance factor that reflects a performance increase when executing an input/output (I/O) intensive process using cell local memory in comparison to using interleaved memory; and
   selecting the cell that is the preferred candidate based, at least in part, on a product of the CPU score and the CPU dominance factor.

15. The computer readable storage medium of claim 11, wherein the request for executing the process includes requested memory allocation information, and the accessed information includes accessed memory allocation information, and wherein the method further comprises:
   determining a memory score based, at least in part, on the requested memory allocation information and the accessed memory allocation information; and
   selecting the cell that is the preferred candidate based, at least in part, on the memory score.

* * * * *